July 8, 1969  P. IVANOVIC ET AL  3,454,243

RESTRAINING SLEEVE-CADRE TENSION BAR

Filed April 24, 1967

INVENTOR.
PETER IVANOVIC
THOMAS P. MULGRAVE
BY

Arthur L. Bolling

ATTORNEY 3,454,243
RESTRAINING SLEEVE-CADRE
TENSION BAR
Peter Ivanovic, Philadelphia, and Thomas P. Mulgrave, Glen Mills, Pa., assignors to the United States of America as represented by the Secretary of the Navy
Filed Apr. 24, 1967, Ser. No. 634,064
Int. Cl. B64f 1/14
U.S. Cl. 244—63           6 Claims

ABSTRACT OF THE DISCLOSURE

Subject invention relates to an improved rupturable tension bar or holdback device which is used with aircraft catapulting equipment. The tension bar is designed to withstand tensile forces up to an accurately predictable amount greater than that necessary for a safe aircraft launch. The exterior surface of the frangible bar is coated with a specific polyurethane polymer elastomer which reduces and/or eliminates projection of high velocity fragments of the bar when the aircraft is launched.

---

The invention described herein may be manufactured and used by or for the Government of the United States of America for governmental purposes without the payment of any royalties thereon or therefor.

In the field of aircraft launching systems, insurance of a safe and reliable launch is of primary concern. It is imperative that adequate launching power is available to insure that once an aircraft is committed to motion, it will be able to become airborne. A power build up such as this is generally achieved by restraining aircraft motion until the combined launching forces of both aircraft engine and catapult device can be simultaneously imposed. This required restraint has been generally accomplished heretofore through the use of a suitable rupturable holdback device which is designed to withstand tensile forces up to an accurately predictable amount greater than that necessary for a safe launch.

The instantaneous release on rupture of ordinary holdback devices, however, have been found to cause various major problems. More specifically, shock loading incidental to instantaneous release often causes structural fatigue and early overhaul of aircraft and launching equipment. Moreover, the whiplash effect of instantaneous release often gives rise to a high incidence of premature shedding of the aircraft tow element and a resulting loss of the aircraft and/or pilot.

In order to resolve these problems, the so called catapult delayed release element was developed. This device which is described in detail in U.S. Patent 3,304,031, issued Feb. 14, 1967, to James J. Mulquin, substitutes parallel slots for the conventional necked-down throat portion of the tension bar so as to cause the bar to separate in shear as well as tension. In this way, the time interval required for the separation is extended and the impulse shock to aircraft and catapult components is decreased. The catapult delayed release element as well as other tension bars, however, have often been found to fragment and produce a serious flying object hazard for personnel and equipment in the vicinity of the launching area.

It is therefore a principal object of the invention to provide a novel and improved aircraft tension bar.

It is a further object of the invention to provide a novel and improved aircraft tension bar wherein fragmentation and high velocity projection of portions of the bar are minimized.

It is a further object of the invention to provide a novel and improved delayed release tension bar having a particular elastomer coating which reduces the hazard of high velocity flying portions of the bar on fragmentation and simultaneously eliminates the need of a corrosion protective finish on the shank portion of the bar.

Other objects and many of the attendant advantages of this invention will be readily appreciated as the same becomes better understood by reference to the following detailed description when considered in connection with the accompanying drawing wherein.

Figure 1:
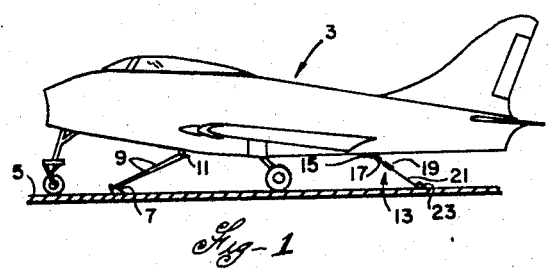
FIG. 1 is a side elevational view of an aircraft in a prelaunch position wherein a preferred embodiment of the invention is illustrated.

Referring now to the various figures of the drawing, it will be noted that the aircraft 3 is ready for a launch from the flight deck 5 of an aircraft carrier. Launching force is transmitted from a catapult to the aircraft 3 through the catapult shuttle 7, the launching bridle 9 and the catapult tow hook 11. The aircraft 3 is restrained from its launch until the required launching force is achieved by the holdback assembly 13. The holdback assembly 13 includes the aircraft tension bar fitting 15, the tension bar 17, the holdback tension bar terminal 19, the holdback cable 21 and the carrier deck cleat 23.

Figure 2:
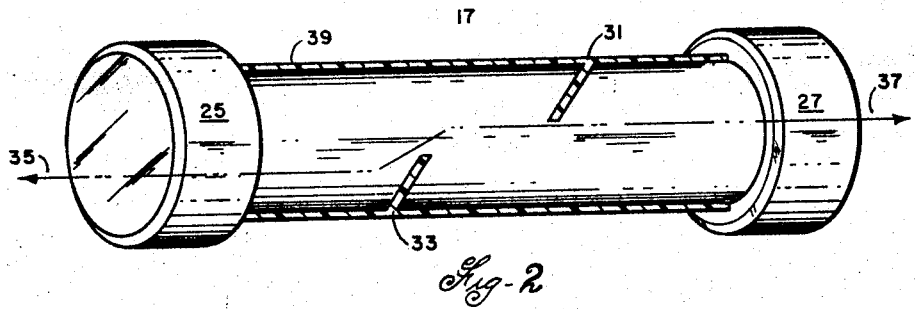
FIG. 2 is a perspective view of a preferred embodiment of the improved tension bar of the invention prior to fragmentation.
Figure 3:
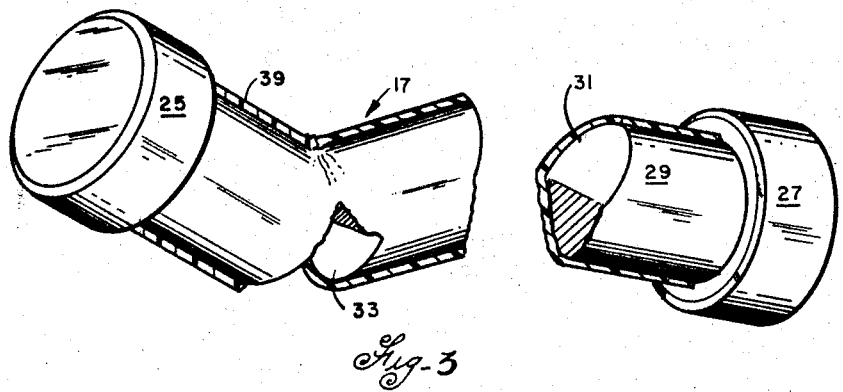
FIG. 3 is a perspective view of a preferred embodiment of the improved tension bar of the invention after fragmentation.

A preferred embodiment of the improved tension bar of the invention is illustrated in FIGS. 2 and 3 of the drawing. As shown therein, the tension bar 17 is a one piece structure manufactured of steel, aluminum, and other similar ductile materials or alloys thereof. The tension bar 17 is enlarged at its opposite ends as at 25 and 27 to respectively accommodate the aircraft fitting 15 and terminal 19. The intermediate cylindrical shank portion 29 of the bar 17 is notched or slotted at 31 and 33 preferably by a suitable saw cut operation on diametrically opposite surfaces. The slots or notches 31 and 33 are of a depth greater than half the diameter of the shank portion of the bar and thereby define an off-set effective load axis 35, 37. In this way, when a launching force in excess of a predetermined magnitude is applied to the bar 17, a force couple is established which tends to straighten the load axis and elongate the bar prior to its rupture. The energy utilized in thus deforming the bar prior to rupture reduces the shock load to the various components of the aircraft and the catapult equipment.

The polyurethane coating 39 which is applied to the exterior surface of the tension bar 17 is prepared by intermixing a polyurethane prepolymer which is known in the art as Adiprene L–100 (Du Pont) with methylene-bis-orthochloroaniline. Adiprene L–100 (Du Pont) which is the reaction product of polytetramethylene ether glycol and 2,4-toluene di-isocyanate, has an average molecular weight of approximately 2000, has a Brookfield viscosity of 500–600 cps. at 212° F., and contains 4.1±.2% isocyanate groups by weight.

A specific preferred embodiment of the coating 39 used on the tension bar 17 is illustrated by the following example:

100 parts by weight of Adiprene L–100 (Du Pont) was first heated to 220° F. and degassed at least 10–15 minutes in a vacuum of 5 mm. of mercury. 16 parts by weight of methylene-bis-orthochloroaniline was then heated to 230° F.–250° F. and mixed in with the Adiprene L–100 (Du Pont). The resulting intermixture was then cast in a suitable mold around a plurality of acetone precleaned tension bars and cured for three hours at 212° F. The working time or pot life of the intermixture was approximately 3 to 5 minutes. Fragmentation of the coated bars on test during actual catapulting operations was found to be minimal.

It is to be understood that although the invention is described herein in connection with a so called catapult delayed release tension bar, other types of tension bars could be similarly coated without departing from the spirit or scope of the invention.

We claim:
1. A frangible tension bar comprising:
   (a) a pair of enlarged extremities;
   (b) a shank portion which extends axially between said pair of enlarged extremities;
   (c) and a polyurethane coating about the shank portion of the bar.
2. A frangible tension bar substantially as described in claim 1 wherein the polyurethane coating is a liquid cast 100% solid urethane elastomer.
3. A frangible tension bar substantially as described in claim 1 wherein the polyurethane coating is a cured intermixture of 100 parts by weight of Adiprene L–100 with 16 parts by weight of methylene-bis-orthochloroaniline.
4. A frangible tension bar substantially as described in claim 1 wherein at least two substantially parallel axially displaced notches are formed in substantially opposite surfaces of the shank portion of the bar to a depth greater than half the shank portion diameter of the bar.
5. A frangible tension bar substantially as described in claim 4 wherein the polyurethane coating is a liquid cast 100% solid urethane elastomer.
6. A frangible tension bar substantially as described in claim 4 wherein the polyurethane coating is a cured intermixture of 100 parts by weight of Adiprene L–100 with 16 parts by weight of methylene-bis-orthochloroaniline.

References Cited

UNITED STATES PATENTS

| | | | |
|---|---|---|---|
| 3,218,832 | 11/1965 | Seidler | 431—94 |
| 3,107,235 | 10/1963 | Larson et al. | 161—190 XR |
| 3,223,273 | 12/1965 | Thorington | 156—172 |
| 3,304,031 | 2/1967 | Mulquin | 244—63 |

OTHER REFERENCES

"Rubber World," vol. 144, No. 4, July 1961, Bill Bros. Pub. Corp., Philadelphia, Pa., T.S. 1870.544, pages 67 to 72 and 78 to 84.

MILTON BUCHLER, *Primary Examiner.*

P. E. SAUBERER, *Assistant Examiner.*

U.S. Cl. X.R.

244—115